United States Patent [19]

Shurman

[11] Patent Number: 5,099,902
[45] Date of Patent: Mar. 31, 1992

[54] OFFSET WOUND HELICAL BEAD FOR PNEUMATIC TIRES

[75] Inventor: Louis W. Shurman, Canton, Ohio

[73] Assignee: Bridgestone/Firestone, Inc., Akron, Ohio

[21] Appl. No.: 632,410

[22] Filed: Dec. 21, 1990

Related U.S. Application Data

[63] Continuation of Ser. No. 359,010, May 30, 1989, abandoned.

[51] Int. Cl.⁵ .......................... B60C 15/04; B60C 15/; B60C 05; D02G 00/00
[52] U.S. Cl. .................................. 152/540; 152/539; 245/1.5; 242/176; 57/215; 57/902
[58] Field of Search ............. 152/450, 539, 540; 156/136, 422; 245/1.5; 57/212, 215, 217, 219, 902; 242/159, 174, 176

[56] References Cited

U.S. PATENT DOCUMENTS

| | | |
|---|---|---|
| 1,231,446 | 6/1917 | Stevens . |
| 1,512,795 | 10/1924 | Pierce . |
| 1,713,871 | 5/1929 | Hopkins . |
| 1,876,953 | 9/1932 | Johnson ................................ 245/1.5 |
| 2,292,980 | 6/1941 | White .................... 152/540 |
| 3,170,662 | 2/1965 | Anderson . |
| 3,949,800 | 4/1976 | Lejeune . |
| 4,290,471 | 9/1981 | Pfeiffer . |
| 4,321,957 | 3/1982 | Hahn et al. .......................... 245/1.5 |
| 4,820,563 | 4/1989 | Rausch ................................ 428/222 |

FOREIGN PATENT DOCUMENTS

| | | |
|---|---|---|
| 518053 | 9/1981 | Australia . |
| 303514 | 2/1989 | European Pat. Off. . |
| 3247441 | 6/1984 | Fed. Rep. of Germany . |
| 1418887 | 10/1965 | France . |
| 58-128906 | 8/1983 | Japan . |
| 60-15438 | 2/1985 | Japan . |

*Primary Examiner*—Michael W. Ball
*Assistant Examiner*—Gregory J. Wilber
*Attorney, Agent, or Firm*—Ernst H. Ruf

[57] ABSTRACT

A pneumatic tire bead is formed into a spiral coil consisting of a plurality of convolutions or turns of wire. The wire may be round, square, oval or hexagonal in cross section. A crimp or offset bend is made in each of the convolutions a distance of one wire width or a fraction of the wire width in each full 360 degree wire turn such that the ends of the bead wire permit the bead side walls to remain in flat parallel planes. This offset relationship reduces nonuniformity in the tire heretofore produced by spirally wound wire beads. The bead wire can be wound in a vertical plane or in a radial spiral clock-like spring fashion. In another embodiment a pair of mirror image offset coils are joined together to form a composite bead preferably for use in heavy duty applications. In still another embodiment a single flat hoop may be placed between a pair of mirror image offset coils to increase resistance to circumferential distortion.

11 Claims, 4 Drawing Sheets

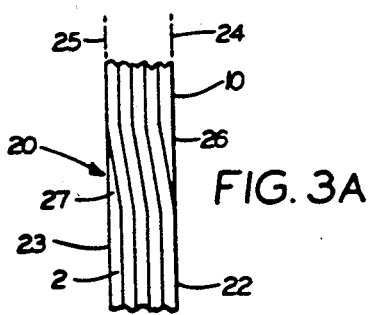
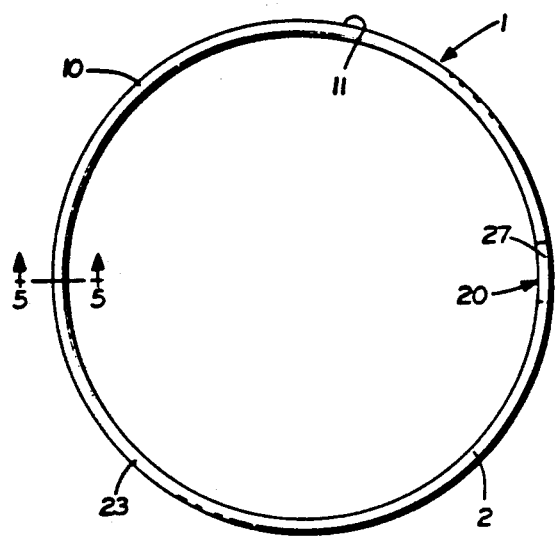
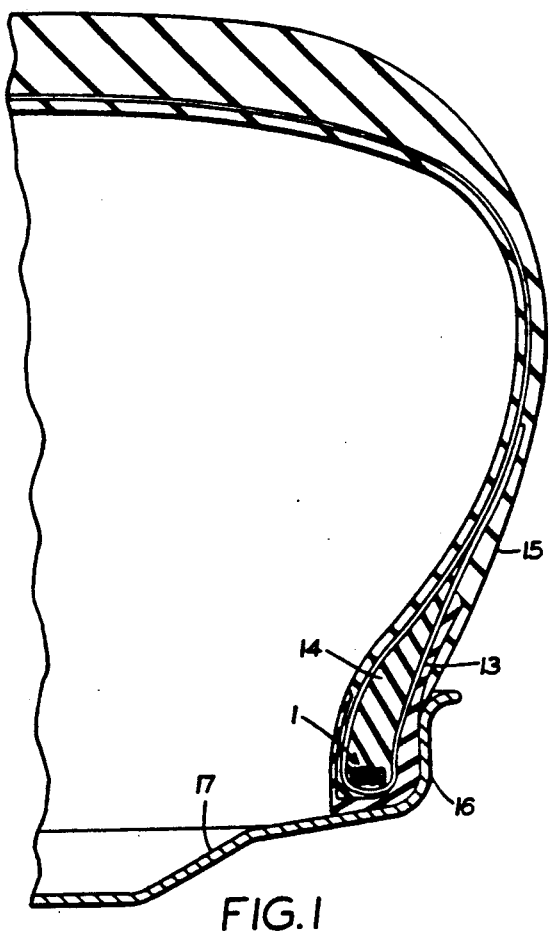
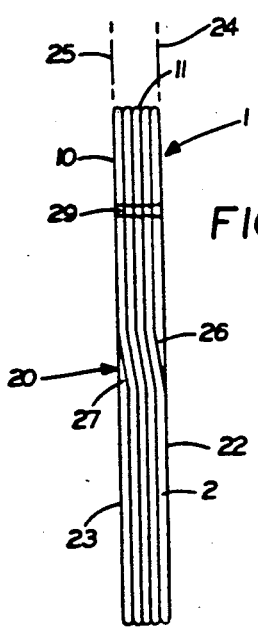
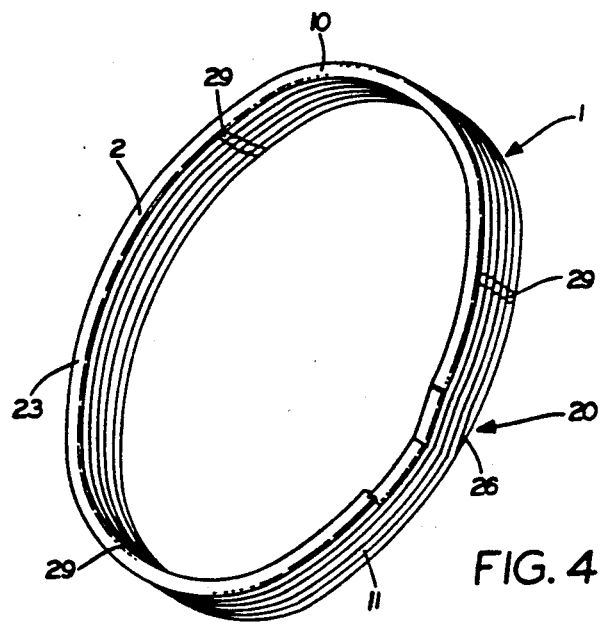

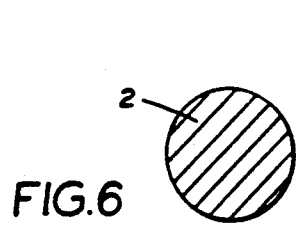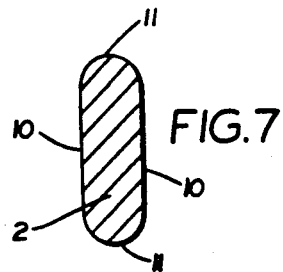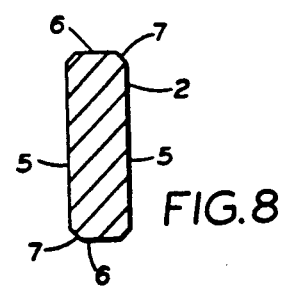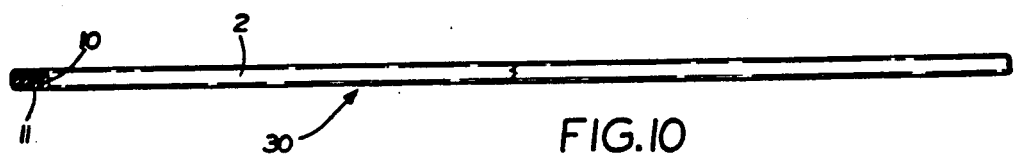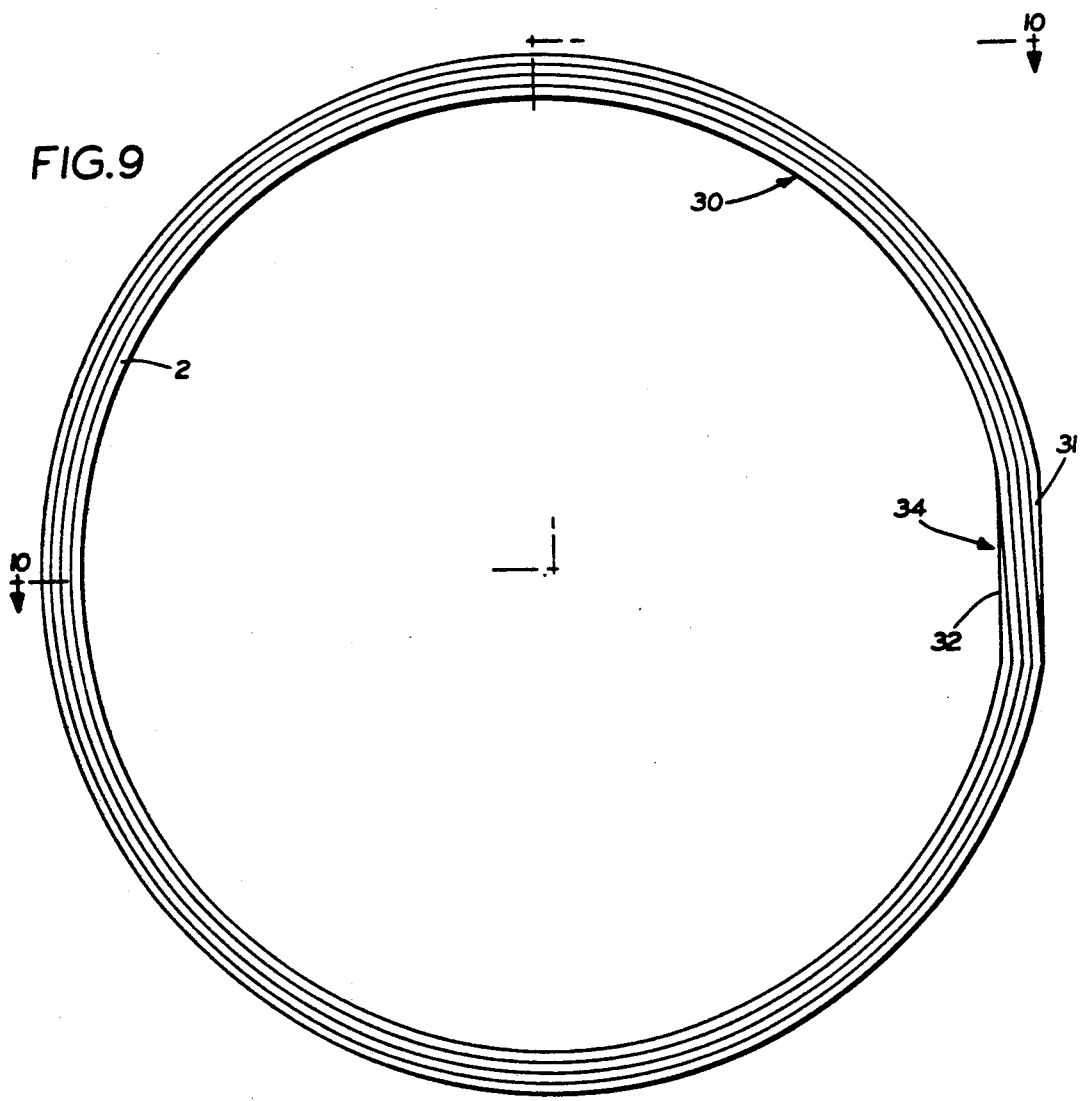

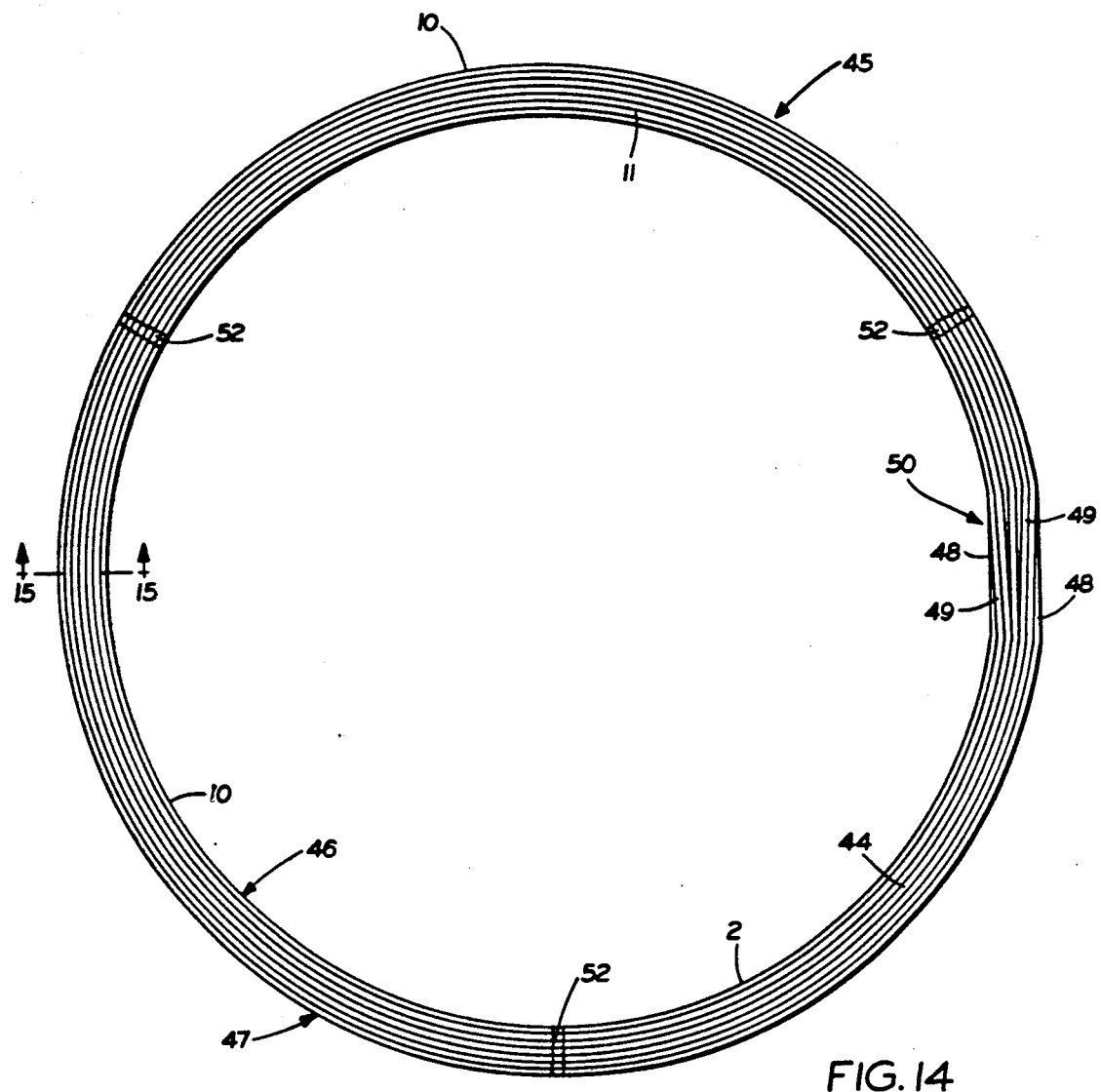
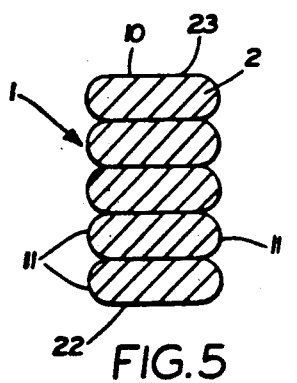
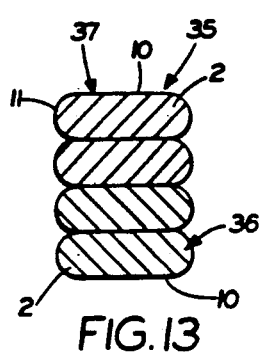
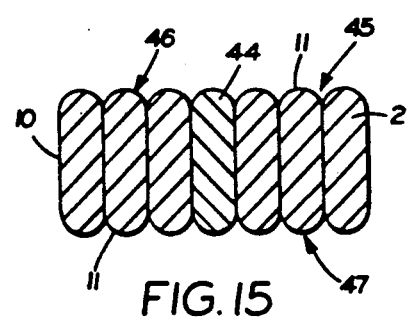
FIG. 14
FIG. 5
FIG. 13
FIG. 15

OFFSET WOUND HELICAL BEAD FOR PNEUMATIC TIRES

This application is a continuation of application Ser. No. 07/359,010, filed May 30, 1989, now abandoned.

BACKGROUND OF THE INVENTION

1. Technical Field

The invention relates to pneumatic tires and particularly to a bead construction molded into the pneumatic tire sidewalls for mounting the tire on a rim. More particularly, the invention relates to a helically wound bead having an offset bending so that the bead sidewalls when in wound position, will remain in a pair of substantially flat parallel planes, thereby improving tire uniformity.

2. Background Information

Pneumatic tires for automobiles generally consist of a crown or tread area which comes into contact with the road surface, and a sidewall on either side of the crown, which terminates at an inner edge which is supported by the rim of a wheel. An annular bead is molded within the terminal edges of the sidewalls to function as an anchorage for the plies forming the carcass of the tire and to ensure a seal between the tire and wheel rim. Various types of bead constructions have been used in the manufacture of pneumatic tires, such as cable rings formed of wire of substantially circular cross-section, and beads in which the strand is wound helically around a core until the desired cross-sectional thickness is achieved. In the formation of the tire beads, splices are produced which can result in non-uniformity in the tire which effects the ride characteristics of the tire. Helical wound beads reduce this non-uniformity produced by heretofore spiral wound bead wires, but still produce some non-uniformity due to the ends of the spiral producing a pair of side laps. Although these helical wound beads increase tire uniformity, it is still desirable to achieve greater uniformity by eliminating the non-uniformity caused by the terminal lapped ends of the helical wound bead wire.

The use of a helical wound bead wire to increase tire uniformity has been recognized in the prior art.

For example, Australian Patent No. 518053 discloses a bead component for a pneumatic tire in which a conventional flat steel wire is wound into a plurality of layers in their direction of thickness, wherein the generally rectangular longer portions of the wire are in abutment with each other.

French Patent No. 1,418,887 discloses a bead area for a tire which is reinforced by a plurality of beads arranged in a circular configuration as opposed to a helical wound bead.

U.S. Pat. No. 3,949,800 discloses a tire bead having a generally rectangular cross-sectional wire, in which each bead ring is comprised of a plurality of these wires which are wrapped adjacent to one another in multiple turns about the tire, in order to form a generally parallelogram type cross-section.

U.S. Pat. No. 4,290,471 discloses another pneumatic tire having a built-up core formed by a plurality of wires wound about one another. The individual wires have a trapezoidal shape to provide clearance spaces between adjacent wires.

U.S. Pat. No. 1,231,446 discloses a tire bead formed from a continuous strip of wire in which the ends of the material have two oblique cuts which are adapted to abut similar cuts on adjacent strips.

Other prior art bead construction which attempt to reduce this non-uniformity caused by splices and side-lap ends are also shown in the following patents.

U.S. Pat. No. 1,512,795 discloses a tire bead comprising a ribbon or hoop formed from a single flexible wire which is bent into a plurality of convolutions and which has a flat or ribbon-like cross-section. The cord is wrapped around itself to unitize the bead. The ends of the wire then are brazed, welded or soldered, or a sleeve is positioned over the wire.

U.S. Pat. No. 1,713,871 discloses a reinforcing tire bead in the form of a steel tape having rounded edges. The strip is formed from metal and is wound in a rather long spiral with one winding or convolution over a predetermined distance.

U.S. Pat. No. 3,170,662 discloses a pneumatic tire having a bead in which the bead core comprises a plurality of convolutions with the leading end being formed as a radially inner end of the bead grommet. The wire is cut at a plurality of longitudinally spaced locations so that the distance between adjacent endings is preferably equal to or greater than the width of the wire. The trailing ends of the wire are cut in a complementary fashion with respect to the leading ends of the wire, so as to form a plurality of wire endings which are spaced apart by a distance which is at least equal to and preferably greater than the width of the wire. The forming of these complementary-shaped ends is to form a bead with substantially parallel inner and outer surfaces to avoid end lap.

Japanese Patent No. 58-128906 discloses a bead ring having a stabilized shape of a plurality of flat wires, having vertically opposed parallel sides. Round wires are positioned between the flat wires so that they will contact the vertical surfaces of the flat wires. In this manner, the wires are wound in a plurality of layers, so that the bead ring is formed as having rounded corner sections.

German Patent No. 3,247,441 discloses a plurality of beads produced by winding a plurality of high tensile-strength wires on a winding drum. The outside of each of the cords is aligned with a profiled strip of unvulcanized rubber, which is adapted to fit into a corresponding strip on an adjacent bead.

Thus, although the prior art recognizes that a helical wound pneumatic tire bead is preferable in many applications to reduce tire non-uniformity, the problem still exists in producing such a bead in a satisfactory and economical manner, without the still inherent overlap caused by the terminal ends of the helical wound wire.

This end overlap has been eliminated in other non-analogous art, such as shown in Japanese Utility Application No. 15438/85, wherein a spring roller for use as a bushing in a drive-chain of a bicycle or motorcycle, is initially wound into a coil shape. The ends then are pressed so that the opposite end faces become planar. These bushings are then placed between the individual links of the drive chain.

However, there is no known prior art of which I am aware which discloses or suggests the formation of a helical wound bead wire for use in pneumatic tires which reduces or eliminates non-uniformity heretofore resulting from a side lap, by crimping or offset bending the helical wound wire over a distance such that the bead sidewall when wound will remain in a substantially flat plane, rather than being angled or inclined along the opposite sides thereof.

SUMMARY OF THE INVENTION

Objectives of the invention include providing a bead for pneumatic tires which is formed from a wound helical wire having an offset in the individual convolutions thereof, which are nested with each other, whereby the sidewalls when wound remain in substantially flat parallel planes, eliminating the heretofore side lap of previously constructed helical wound beads.

Another objective is to provide such a pneumatic tire bead construction in which the wire has an oval cross-sectional configuration, and in which the crimping or offset bending of the individual convolutions of the helix is a distance of one or a fraction of the wire width on each full 360 degree wire turn resulting in a bead wire which is rounder, flatter and more uniform than other known types of cable or weftless beads.

Still another objective of the invention is to provide a bead construction in which the finished offset wires for individual convolutions are secured to each other at circumferentially spaced securement areas by use of an ultraviolet light activated adhesive, solder, or spot welded to form the final assembled bead construction.

Still another objection of the invention is to provide such an improved bead construction which can be produced economically on automatic bead winding equipment eliminating expensive manufacturing procedures, thereby enabling the construction to be utilized in the mass production of beads for use in pneumatic tires for passenger vehicles and trucks.

Still another objective is to provide such an improved bead construction in which the oval cross-sectional configuration of the bead wire eliminates square corners heretofore causing stress areas.

A further objective of the invention provides such an improved bead construction which is formed by a pair of mirror image offset wound beads which are assembled together, in which built-in forces tend to keep the pair of beads together; and which such construction is preferable for use in heavy duty applications, such as trucks and racing vehicles; and in which a single hoop can be located between such a pair of wound beads to assist in further reducing circumferential deformation in the bead.

These objectives and advantages are achieved by the improved bead construction of the invention, the general nature of which may be stated as including a bead for a pneumatic tire, including a continuous strand of metallic wire having a substantially constant oval cross-sectional shape wound into a helix with an offset bend being formed in each convolution of the helix a distance of one or a fraction of the wire width, with said offset bends lying in a nested relationship with each other whereby each of a pair of opposed end faces of the helix remain in a flat plane parallel to the flat plane of the other end face.

BRIEF DESCRIPTION OF THE DRAWINGS

Preferred embodiments of the invention illustrative of the best modes in which applicant contemplates applying the principles, are set forth in the following description and are shown in the drawings and are particularly and distinctively pointed out and set forth in the appendant claims.

FIG. 1 is a generally diagrammatic sectional view of one-half of a pneumatic tire mounted on a rim, showing one form of the improved bead construction embedded within the bead area of the tire;

FIG. 2 is a plan view of the offset wound helical bead of the invention;

FIG. 3 is a side view of the bead of FIG. 2;

FIG. 3A is an enlarged fragmentary plan view showing the offset area of the improved bead;

FIG. 4 is a perspective view of the offset wound helical bead of FIGS. 2 and 3 with portions broken away to show the offset area;

FIG. 5 is an enlarged sectional view taken on line 5—5, FIG. 2;

FIGS. 6, 7 and 8 are enlarged cross-sectional views of three different types of wire from which the offset bead is formed;

FIG. 9 is a plan view of a second embodiment of the offset helical wound bead wire;

FIG. 10 is a sectional view taken on line 10—10, FIG. 9;

FIG. 13 is an enlarged sectional view taken on line 13—13, FIG. 12;

FIG. 14 is a plan view of a fourth embodiment of the improved offset wound helical bead consisting of a pair of offset beads and an intervening flat hoop placed in abutting relationship; and FIG. 15 is an enlarged sectional view taken on line 15—15, FIG. 14.

Similar numerals refer to similar parts throughout the drawings.

DESCRIPTION OF THE PREFERRED EMBODIMENTS

First Embodiment

Figure 11:
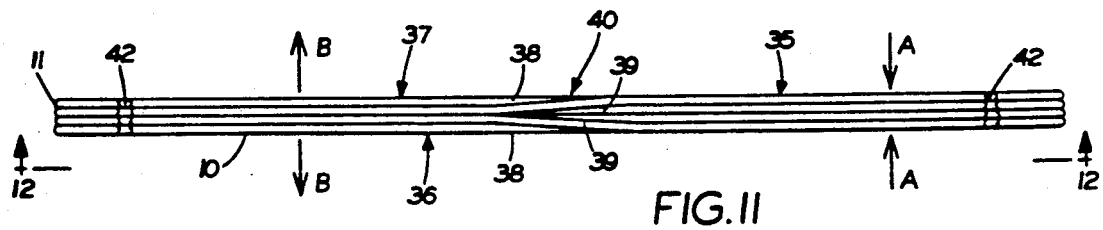
FIG. 11 is an end view of a third embodiment of the improved bead construction consisting of a pair of mirror image offset wound beads joined in abutting relationship for heavy duty applications.

A first embodiment of the improved offset wound helical bead is indicated generally at 1, and is shown particularly in FIGS. 2-5, and is shown in an assembled position within the terminal end of a pneumatic tire in FIG. 1. Referring to FIGS. 2-5, bead 1 is formed by a single strand of metal wire 2 which is wound in a helical configuration.

Wire strand 2 may have a variety of cross-sectional configurations, three of which are shown in FIGS. 6-8. The bead wire configuration shown in FIG. 6 has a circular cross section, whereas the bead wire shown in FIG. 8 has an octagonal configuration, formed by a pair of parallel straight sidewalls 5, a pair of parallel straight end walls 6, connected by short flat corners 7. The preferred cross-sectional configuration of wire 2 is shown in FIG. 7 and has an oval shape formed by a pair of parallel elongated flat sides 10 and rounded ends 11 with the height of the wire being in the range of approximately 1.1 to 5.5 times the thickness of the strand. The oval cross-sectional configuration shown in FIG. 7 is preferred over those of FIGS. 6 and 8 for most applications, and is shown in the various bead embodiments in the remainder of the drawings. This oval configuration is preferred since it eliminates sharp corners which are more susceptible to stress areas, and is able to achieve a more constant uniform cross-sectional configuration at less expense than the round configuration of FIG. 6. It also is considerably less expensive to manufacture by the use of forming rolls than the octagonal cross-sectional wire configuration of FIG. 8. Another wire cross-sectional configuration which can be utilized has a rectangular cross section (not shown) consisting of four flat sides meeting at right angles. However, this rectangular cross-sectional configuration is more susceptible to stress areas at the sharp corners that could cause fatigue and breakage.

Referring again to FIG. 1, improved bead construction 1 is shown mounted within the turned-up end of a body ply carcass 13, molded within a rubber bead strip 14 for mounting and securing the tire sidewall 15 within mounting flange 16 of a tire rim 17.

Figure 12:
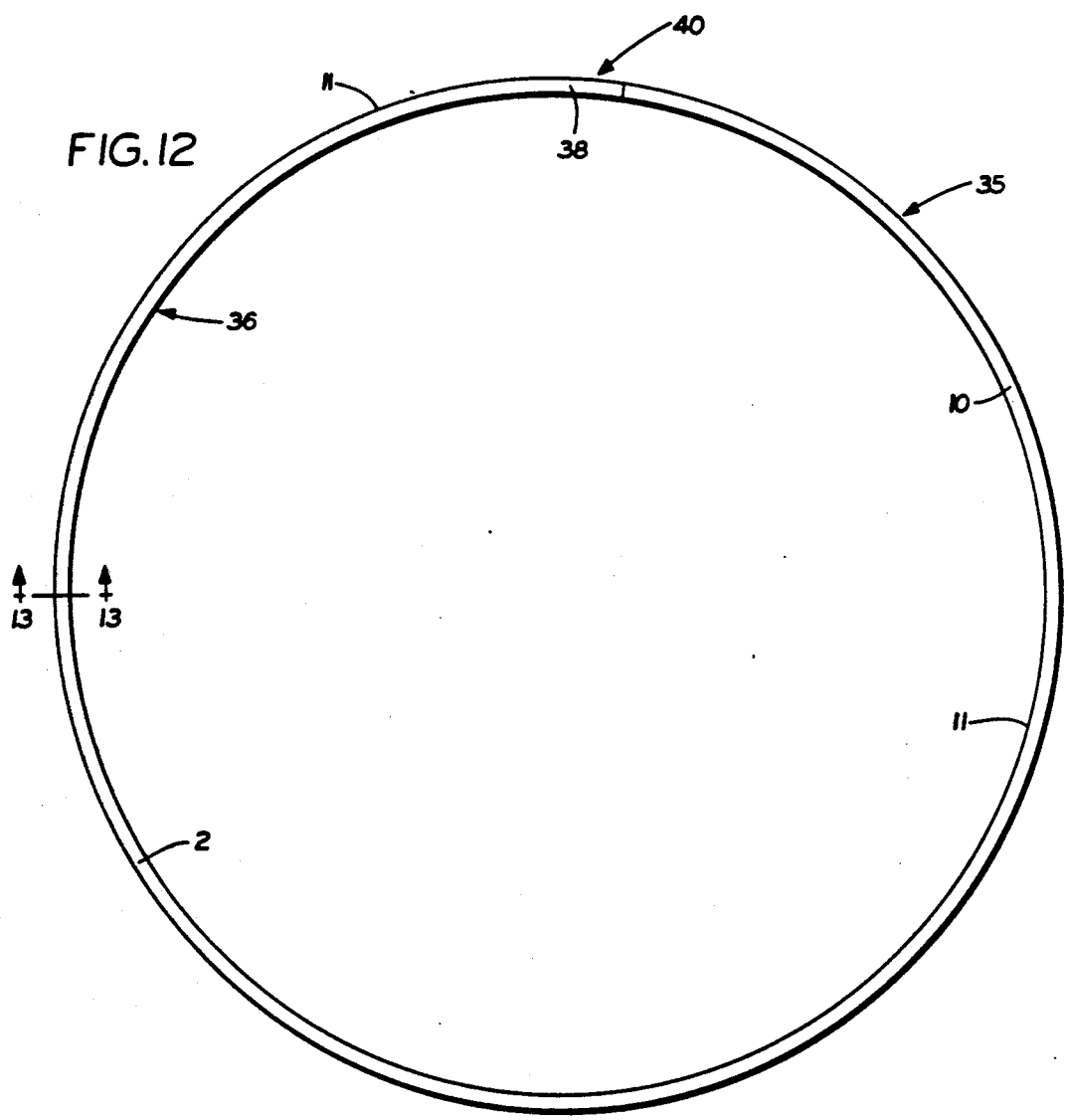
FIG. 12 is a plan view of the embodiment shown in FIG. 11 looking in the direction of arrows 12—12, FIG. 11.

FIGS. 2-4 are shown considerably out of proportion for clarity sake, since the cross-sectional dimensions of the individual wire strand 2 will be considerably smaller in proportion to the overall diameter of the wound bead wire, and more closely resembles the embodiments shown in FIGS. 9, 12 and 14.

In accordance with the main feature of the invention an offset area indicated generally at 20 (FIG. 3A), is formed in each convolution of wire strand 2 and are arranged in a nested configuration at area 20. This offset bending enables the coil side surfaces indicated at 22 and 23, formed by the outer sidewalls 10 of the outer convolutions of wire strand 2, to lie in a pair of imaginary planes 24 and 25 which are parallel to each other. Preferably, the ends 26 and 27 of wire strand 2 are beveled to match the angularity of the offset area in the wire to provide an even more smooth transition and flat outer bead surfaces.

In the embodiment shown in FIGS. 2-5, the opposed parallel longer flat sides 10 of the oval cross-sectional configuration of wire 2, as shown in FIG. 7, are positioned next to each other in an axial direction with the generally rounded ends 11 forming the inside and outside circumferences of the helix.

The offset in each convolution of wire 2 preferably is equal to the wire width or slightly less, in order to arrive at the desired flat sided configurations as shown in FIG. 3A. Preferably, three or more circumferentially-spaced securement areas 29 (FIGS. 3 and 4) are formed about helical bead 1 to maintain the wire strand 2 in its assembled uniform condition until united with the bead strip or filler 14. These securement areas can be formed by an adhesive, spot weld or solder, etc. One type of adhesive found extremely satisfactory for use in such an application is an ultraviolet activated adhesive of a type well-known in the art.

Second Embodiment

A second embodiment of the helical bead of the invention is indicated generally at 30, and is shown particularly in FIGS. 9-10. In this embodiment, the individual metal wire strand is formed into a spiral configuration upon itself in a clock-like spring arrangement with the terminal ends 31 and 32 thereof being tapered so as to lie in conformity with the offsets 33 formed in each of the convolutions of the bead which are in a nested relationship in an offset area 34. The flat sides 10 of each wire convolution lie in abutting relationship in a radial direction as shown in FIG. 10, perpendicular to the central axis of the coil in contrast to the convolution arrangement of embodiment 1 as shown in FIG. 5. Thus the flat sides of the wire strands form the inner and outer circumferences of the helix instead of the rounded ends forming these circumferences as in bead 1 of FIGS. 2-5.

Third Embodiment

A third embodiment of the improved bead construction is indicated generally at 35, and is shown in FIGS. 11-13. Embodiment 35 consists of a pair of mirror image, individually wound helical beads 36 and 37. Each bead 36 and 37 are similar and are formed of a plurality of convolutions. One complete convolution is shown for each of the beads in FIG. 11, with each convolution consisting of one full 360° turn and a 360° splice ending on each side of the full turn. Outer ends 38 and inner ends 39 of each coil are tapered so as to nest with an offset area 40 formed in the single convolution, or each convolution if the plurality of convolutions were used, for each bead 36 and 37. By placing beads 36 and 37 into abutment as shown in FIG. 11, the one side (right hand side) will attempt to draw together as indicated by arrows A, due to the formation of the offset area 40 therein, while the opposite side (left hand end) has a tendency to pull apart as indicated by arrow B. It should be noted that the stated conditions of drawing together and/or pulling apart tend to occur mainly in high performance and heavy duty tires, under extreme conditions. A plurality of circumferentially spaced securement areas 42 are formed at three or more locations about the circumference of bead 35 by welding, soldering or an adhesive similar to securement areas 29 discussed above.

In this third embodiment, the free beveled ends of each bead lie in a radial spaced relationship with respect to each other with the offset portion extending therebetween. The outer free ends of the pair of beads are radially spaced from each other by the offset, with the inner free beveled ends lying in abutting juxtaposition as shown in FIG. 11.

Fourth Embodiment

A fourth embodiment of the improved bead construction is indicated generally at 45, and is shown in FIGS. 14-15. Bead construction 45 is formed by a pair of individual mirror image inner and outer beads 46 and 47 each formed by three convolutions, in the same manner as bead embodiment 35 in combination with a single flat hoop 44 sandwiched therebetween. Hoop 44 is a flat annular member formed by a single strand of wire, the ends of which are joined such as by welding in an abutting relationship. The individual inner and outer terminal ends 48 of each wire are beveled to nest with the offsets 49 which are arranged in a nested offset area 50 in a similar manner as described above for the particular embodiment shown in FIGS. 11 and 12 where the coils are arranged in a radially stacked spiral clocklike spring arrangement. Round hoop 44 provides increased circumferential strength and uniformity to bead 45. Such a round hoop 44 can be configured for central location in the shown two piece construction or as the innermost or outermost member in a two piece construction. Beads 46, 47 and hoop 44 also are joined together at three of more equally spaced securement areas 52.

The improved bead constructions described above provide beads which improve tire uniformity by providing helical configured beads having offset areas which avoid the end overlap occurring with prior helical bead configurations. This elimination of end overlap is achieved by crimping or offsetting an area in each convolution of the wire, a distance generally equal to or slightly less than the cross-sectional width of the wire strand. Furthermore, the pairs of offset wound helical beads (FIGS. 11-15) provide a bead highly suitable for heavy duty applications, and when an intervening flat hoop 44 is sandwiched therebetween (FIGS. 14 and 15), it provides a bead having even greater increased circumferential strength and uniformity.

Accordingly, the offset wound helical bead is simplified, provides an effective, safe, inexpensive, and efficient construction which achieves all the enumerated objectives, provides for eliminating difficulties encountered with prior bead constructions, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention are by way of example, and the scope of the invention is not limited to the exact details shown or described.

Having now described the features, discoveries and principles of the invention, the manner in which the improved offset wound helical bead is constructed and used, the characteristics of the construction, and the advantageous, new and useful results obtained; the new and useful structures, devices, elements, arrangements, parts and combinations, are set forth in the appended claims.

We claim:

1. A pneumatic tire construction including a tread, a pair of sidewalls, each terminating in an annular bead area for mounting the tire on a rim, and an annular bead contained within the bead area, said bead including a first single strand of metallic wire wound upon itself into a spiral with a first end of said first strand being located on an outer circumference of the spiral and a second end of said strand being located on an inner circumference of the spiral; a bend being formed in the wire in a radial direction in each convolution of the spiral, said bends being nested in a radial direction with each other whereby the first end of said first strand lies in a planar circle defined by the outer circumference and the second end of said strand lies in a planar circle defined by the inner circumference; and a second single strand of wound wire having a mirror image of said first single strand being in a secured relationship with said first single strand.

2. The tire construction defined in claim 1 in which the wire strand includes a pair of generally flat parallel sides joined by generally rounded corners with the distance between the flat sides defining the thickness of the strand; and in which the bend has a radial distance equal to the thickness of the strand.

3. The tire construction defined in claim 1 in which the first and second ends are beveled radially inwardly to provide a smooth merger with an adjacent convolution at the bend.

4. The tire construction defined in claim 1 in which a single flat hoop of wire is sandwiched between the pair of mirror image first and second strands.

5. An annular bead construction for a pneumatic tire including a single strand of metallic wire wound upon itself into a spiral with a first end of the strand being located on an outer circumference of the spiral and a second end of the strand being located on an inner circumference of the spiral; a bend being formed in said wire in each convolution of the spiral, said bends being nested in a radial direction with each other whereby an outer end of the strand lies in a planar circle defined by the outer circumference and an inner end of the strand lies in a planar circle defined by the inner circumference; and another single strand of wound wire being a mirror image of said single strand being in a secured relationship with said single strand.

6. The bead construction defined in claim 5 in which a single flat hoop of wire is sandwiched between the pair of mirror image strands.

7. An annular bead construction for a pneumatic tire including first and second continuous strands of metallic wire each wound into a helix having a pair of opposed side faces and a pair of opposed end faces, each of said strands terminating in first and second free ends with said first and second free ends of each strand terminating in a spaced relationship with respect to each other with a bent strand portion extending therebetween; with the first free ends of said strands lying adjacent to each other and with the second free ends of said strands being spaced from each other by the bent strand portions.

8. The bead construction defined in claim 7 in which the metallic wire has a substantially oval cross-sectional configuration having a pair of opposed flat sides and a pair of opposed rounded edges; in which the flat sides of adjacent strands are in an abutting relationship in an axial direction of the helix.

9. The bead construction defined in claim 8 in which the opposed rounded edges form inner and outer circumferences of the helix.

10. The bead construction defined in claim 7 in which a continuous hoop formed of a single strand of wire is sandwiched between and in juxtaposition with the first and second strands of wire.

11. The bead construction defined in claim 10 in which securement means extend across the strands for securing together said strands.

* * * * *